United States Patent
Flinchbaugh

(10) Patent No.: US 7,038,715 B1
(45) Date of Patent: May 2, 2006

(54) DIGITAL STILL CAMERA WITH HIGH-QUALITY PORTRAIT MODE

(75) Inventor: Bruce E. Flinchbaugh, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/465,242

(22) Filed: Dec. 15, 1999

Related U.S. Application Data

(60) Provisional application No. 60/116,624, filed on Jan. 19, 1999.

(51) Int. Cl.
*H04N 5/225* (2006.01)
*H04N 5/228* (2006.01)

(52) U.S. Cl. .................... 348/207.99; 348/208.14; 348/222.1; 382/103

(58) Field of Classification Search ............. 348/14.01, 348/14.02, 14.07, 14.08, 14.1, 14.15, 207.99, 348/208.14, 222.1, 239, 169, 576; 382/103, 382/118, 190, 209, 276, 291; 386/95, 96, 386/107, 108
See application file for complete search history.

(56) References Cited

U.S. PATENT DOCUMENTS

| | | | | |
|---|---|---|---|---|
| 4,991,009 A | * | 2/1991 | Suzuki et al. .......... | 375/240.12 |
| 5,296,945 A | * | 3/1994 | Nishikawa et al. ......... | 358/518 |
| 5,561,796 A | * | 10/1996 | Sakamoto .................... | 386/96 |
| 5,805,745 A | * | 9/1998 | Graf ........................... | 382/291 |
| 6,184,926 B1 | * | 2/2001 | Khosravi ................ | 348/14.07 |
| 6,272,231 B1 | * | 8/2001 | Maurer ...................... | 382/118 |
| 6,407,777 B1 | * | 6/2002 | DeLuca ...................... | 348/576 |

OTHER PUBLICATIONS

Black, M.J., et al.; *Learning Parameterized Models of Image Motion*, Proc. IEEE Computer Society Conf. on Computer Vision and Pattern Recognition, IEEE, 1997, pp. 561-567.
Burt, P.J., et al.; *Object Tracking With a Moving Camera*, Proc. Workshop on Visual Motion, IEEE Computer Society Order No. 1903, Mar. 1989, pp. 2-12.
Crowley, J.L., et al.; *Multi-Modal Tracking of Faces for Video Communications*, Proc. IEEE Computer Society Conf.

(Continued)

*Primary Examiner*—Aung Moe
(74) *Attorney, Agent, or Firm*—Robert D. Marsahll, Jr.; W. James Brady, III; Frederick J. Telecky, Jr.

(57) ABSTRACT

A digital still camera (10) receives and digitizes visible radiation (17) and sound waves (32) from a scene (12). When an operator actuates a shutter release (46), the camera detects and evaluates digitized information (22, 38) from the scene in a continuing manner, until a point in time when information representative of a human facial characteristic satisfies a specified criteria set by the operator through use of switches (47, 48) and a display (51). The camera then records in a memory (59) a digital image of the scene, which corresponds to the point in time. The stored image is a high-quality image, which can avoid characteristics such as eyes that are closed or a mouth that is open.

5 Claims, 2 Drawing Sheets

OTHER PUBLICATIONS

On Computer Vision and Pattern Recognition, IEEE, 1997, pp. 640-645.

Jebara, T.S., et al.; *Parametrized Structure From Motion for 3D Adaptive Feedback Tracking of Faces*, Proc. IEEE Computer Society Conf. On Computer Vision and Pattern Recognition, IEEE, 1997, pp. 144-150.

Rabiner, L.R.; *A Tutorial on Hidden Markov Models and Selected Applications in Speech Recognition*, Proc. Of the IEEE, vol. 77, No. 2, Feb. 1989, pp. 257-286.

Rowley, H.A., et al.; *Neural Network-Based Face Detection*, Proc. IEEE Computer Society Conf. On Computer Vision and Pattern Recognition, IEEE, 1996, pp. 203-208.

* cited by examiner

DIGITAL STILL CAMERA WITH HIGH-QUALITY PORTRAIT MODE

This application claims priority under 35 USC §119(e)(1) of Provisional Application No. 60/116,624, filed Jan. 19, 1999.

TECHNICAL FIELD OF THE INVENTION

This invention relates in general to a still camera and, more particularly, to a still camera which uses information from a scene to record a quality image of the scene.

BACKGROUND OF THE INVENTION

There are commercially available still cameras which use information from a scene in order to improve the quality of the image of the scene which is selected and recorded. For example, there are existing still cameras which respond to light conditions from the scene by adjusting the exposure settings so as to optimize the quality of the color and contrast in the images which are recorded. As another example, there are existing still cameras which respond to light from a scene by selectively energizing a flash or other light in order to reduce the effect of "red eye" in recorded images of human subjects in the scene. These types of techniques may be used in either a traditional still camera, which records images on film, or in a digital still camera, which records a digital image in some form of electronic storage device.

While these prior techniques have been generally adequate for their intended purposes, they have not been satisfactory in all respects. In particular, even when these cameras are using these known techniques in an effective manner, they can still take images which are of poor quality in some respects, particularly when the recorded image includes one or more humans. For example, it is very common for a human to blink just as a picture is taken, causing the resulting image to be undesirable. As another example, a picture may be taken at a point in time when one of the human subjects is talking, and thus has his or her mouth in an unattractive open position. As a further example, at the point in time when an image is recorded, a person in the image may be turning his or her head, so that it is not facing substantially directly toward the camera.

Frequently, the person operating the camera does not become aware of problems of this type until much later, for example when the film is developed, or when a digital image is downloaded to a computer for viewing. When it is finally discovered that the image is of poor quality, for example because a human subject has blinked, the opportunity to take a further picture of improved quality has usually been lost.

SUMMARY OF THE INVENTION

From the foregoing, it may be appreciated that a need has arisen for a method and apparatus of taking still pictures which involve the automatic selection of an image of high quality, particularly where the image includes a human. This may, for example, include reduction or elimination of images in which a person's eyes are partially or fully closed, or in which a person's mouth is partially or fully open.

According to the present invention, a method and apparatus are provided to address this need, and involve operation of a camera by waiting for an operator action, and then responding to the operator action by: detecting and evaluating information from a scene in a continuing manner until a point in time at which it is determined that the information from the scene includes information which is representative of a human facial characteristic and which satisfies a specified criteria; and by recording an image of the scene corresponding substantially to the point in time.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
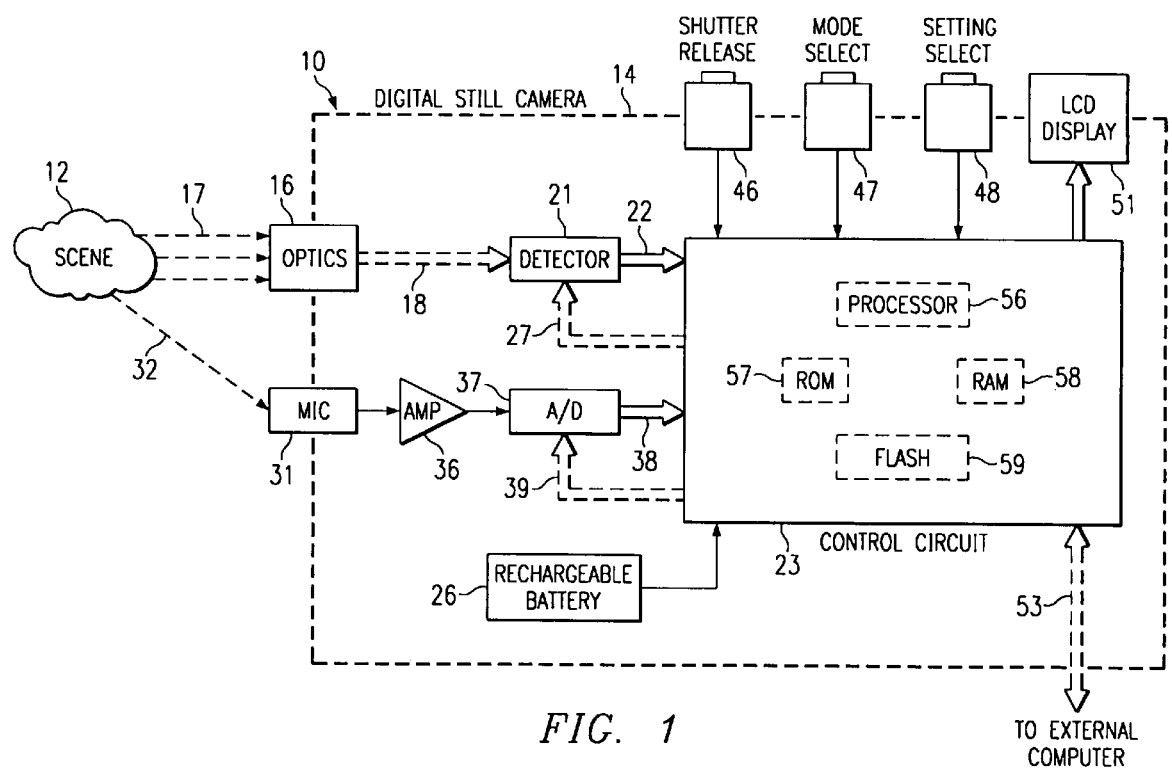
FIG. 1 is a block diagram showing a scene, and showing a digital still camera which embodies the present invention and can record a digital image of the scene.

FIG. 1 is a block diagram showing a digital still camera 10 which embodies the present invention, and which can be used to select and record a picture of a scene 12, the picture being in the form of a digital image.

The broken line 14 in FIG. 1 is a diagrammatic representation of a housing of the digital still camera 10. The camera 10 includes an optics section 16, which receives radiation 17 from the scene 12, the radiation 17 being in the visible spectrum, and being emitted or reflected by the scene 12. The optics section 16 processes the radiation 17, so as to output processed radiation 18 in the visible spectrum, in a manner forming a two-dimensional image on an image detector 21. In the disclosed embodiment, the image detector 21 may be a two-dimensional charge coupled device (CCD) of a commercially available type, which is commonly used in digital still cameras.

The image detector 21 converts the radiation 18 into a series of successive electronic digitized images, which are output in an electrical form at 22. The camera 10 includes a control circuit 23, which receives the digital images produced at 22, and which is discussed in more detail later. In the disclosed embodiment, the control circuit 23 provides control signals at 27 to the image detector 21, for example to facilitate timing and synchronization between the control circuit 23 and the image detector 21.

The control circuit 23, and other electrical components of the camera 10, receive power from a rechargeable battery 26. The control circuit 23 of the disclosed embodiment is designed to automatically turn itself off, or to enter a low power mode, if the camera 10 is not used for a predetermined time interval, such as five minutes.

The camera 10 further includes a microphone 31, which is responsive to sound waves 32 emanating from the scene 12. For example, the scene 12 may include a person who is speaking and/or laughing, and any such sound travels to the microphone 31 in the form of sound waves 32. The output of the microphone 31 is amplified by an amplifier 36, and is then digitized by an analog-to-digital (A/D) converter 37, which is of a commercially available type. The digital output signals from the analog-to-digital converter 37 are supplied at 38 to the control circuit 23. In the disclosed embodiment, the control circuit 23 provides control signals at 39 to the analog-to-digital converter 37, for example to facilitate timing and synchronization between the control circuit 23 and the analog-to-digital converter 37.

The camera 10 includes a shutter release switch 46, a mode select switch 47, and a setting select switch 48. Each of the switches 46–48 is a momentary single pole single throw (SPST) switch, having an output which is coupled to a respective input of the control circuit 23. The shutter release switch 46 can be manually actuated by an operator of the camera, in order to cause the camera 10 to take a picture. Since the disclosed camera 10 is a digital camera, it does not actually have a traditional mechanical shutter. However, the switch 46 is nevertheless referred to as a shutter release switch, for historical reasons. The mode select switch 47 and the setting select switch 48 are discussed in more detail later.

The camera 10 also includes a display 51, which is a liquid crystal display (LCD). The display 51 provides to the operator a visual display of pertinent information regarding the operational status of the camera 10. In the disclosed embodiment, this information includes an indication of a mode which has been selected using the mode select switch 47, and an indication of a corresponding setting which has been selected using the setting select switch 48, as discussed in more detail later.

The camera 10 further includes a not-illustrated connector, which permits the control circuit 23 to be electrically coupled to an external computer by a cable, for example as shown diagrammatically at 53 in FIG. 1. This permits pictures taken by the camera 10, which are in the form of digital images, to be downloaded from the control circuit 23 to the external computer.

The control circuit 23 includes a processor 56, a semiconductor read-only memory (ROM) 57, a semiconductor random access memory (RAM) 58, and a semiconductor flash memory 59. The processor 56 may be a commercially available microprocessor of a known type, or an equivalent device. The ROM 57 is used to store a program which is executed by the processor 56, and the RAM 58 is used by the processor 56 to store data associated with dynamic execution of the program in the ROM 57. The processor 56 uses the flash memory 59 to store one or more digital images, which each represent a respective picture taken by the camera 10. The digital images stored in the flash memory 59 may be in any one of a number of different digital image formats, all of which are well known to persons skilled in the art.

An explanation will now be given of how the mode select switch 47 and the setting select switch 48 are used to program the operation of the camera 10. The disclosed camera 10 has eight different modes which may be programmed by an operator, and which are shown in the left column of TABLE 1. The operator may step through these modes in a cyclic manner, by repeatedly pressing the mode select switch 47. In other words, each time the mode select switch 47 is pressed, the camera 10 advances from the current mode to the next successive mode shown in TABLE 1, which includes an automatic wrap from the last mode to the first mode in TABLE 1. The modes shown in TABLE 1 include a PORTRAIT mode, SIZE mode, NUMBER OF FACES mode, PRIORITY mode, EYES mode, MOUTH mode, HEAD mode, and SOUND mode. During operation of the camera 10, the name of the mode which is currently selected is always displayed to the operator on the LCD display 51.

TABLE 1

| MODE | SETTING |
| --- | --- |
| PORTRAIT | OFF |
|  | ON |

TABLE 1-continued

| MODE | SETTING |
| --- | --- |
| SIZE | OFF |
|  | MINIMUM SIZE 1 |
|  | . |
|  | . |
|  | . |
|  | MINIMUM SIZE N |
| NUMBER OF FACES | ALL |
|  | 1 |
|  | . |
|  | . |
|  | . |
|  | N |
| PRIORITY | NEAREST IMAGE CENTER |
|  | LARGEST |
| EYES | OFF |
|  | OPEN |
| MOUTH | OFF |
|  | CLOSED |
| HEAD | OFF |
|  | FACING CAMERA |
| SOUND | OFF |
|  | WORD ("Cheese") |
|  | LAUGHTER |

Each of the eight modes in TABLE 1 has associated with it two or more settings, which are shown in the right column of TABLE 1. The operator can cycle through the settings for the currently selected mode by repeatedly pressing the setting select switch 48. The current setting for the currently selected mode is displayed on the LCD display 51 at all times during operation of the camera 10. As will be apparent from the discussion which follows, several modes may active at the same time, but in the disclosed embodiment the display 51 displays only the currently selected mode, and the current setting for that mode. It would, of course, be possible to alternatively use a display which shows the current setting for all eight modes, although this would probably increase the complexity and cost of the display 51.

Referring now in more detail to TABLE 1, the PORTRAIT mode has two settings, which are OFF and ON. The PORTRAIT mode determines whether the camera 10 is operating in a special PORTRAIT mode of operation, which is discussed later.

The SIZE mode has a plurality of possible settings, which include OFF and MINIMUM SIZE 1 through MINIMUM SIZE N. With respect to one or more persons who may be present in the scene 12, the SIZE mode, if enabled, determines the minimum size of a person's face which the camera 10 will recognize in an image from the scene 12.

The NUMBER OF FACES mode has a plurality of settings, which include ALL and 1 through N. This mode puts an upper limit on the number of human faces which the camera 10 will select and analyze in an image from the scene 12, as discussed later.

The PRIORITY mode has two settings, which are NEAREST IMAGE CENTER and LARGEST. The setting for the PRIORITY mode is essentially ignored unless the camera 10 detects more faces than are specified by the NUMBER OF FACES mode setting, and in that case the PRIORITY mode specifies how to select a subset of the detected faces which is equal in number to the specified NUMBER OF FACES. In particular, if the setting for the PRIORITY mode is NEAREST IMAGE CENTER, then faces nearest to the center of the image are selected before faces in the periphery of the image, up to the number specified by the setting for the NUMBER OF FACES mode. On the other hand, if the setting for the PRIORITY mode is LARGEST, faces will be selected in terms of size, from largest to smallest, up to the number specified by the setting for the NUMBER OF FACES mode.

The EYES mode has two settings, which are OFF and OPEN. When set to OFF, the camera 10 ignores the eyes of each detected face. On the other hand, when set to OPEN, the camera 10 ensures that the eyes of each selected face are open at the time the camera 10 stores a digital image in order to take a picture. Stated differently, if the EYES mode is set to OPEN, a digital image will not be selected for storage as a picture unless the eyes in each detected and selected face are properly open, or in other words are not in the middle of a blink.

The MOUTH mode has two settings, which are OFF and CLOSED. When set to OFF, the mouths of detected and selected faces in the image are ignored. On the other hand, if set to CLOSED, then each detected and selected face must have a mouth which is substantially closed in order for a digital image to be selected and saved to effect the taking of a picture.

The HEAD mode has two settings, which are OFF and FACING CAMERA. If set to OFF, the camera 10 does not attempt to evaluate the orientation of the head for any face detected and selected by the camera 10. On the other hand, if set to FACING CAMERA, the camera 10 will attempt to ensure that each detected and selected face is oriented so as to be looking substantially directly at the camera 10 at the point in time when a digital image is selected and saved in order to effect the taking of a picture.

The SOUND mode has three settings, which are OFF, WORD, and LAUGHTER. If the SOUND mode is set to OFF, the camera 10 will ignore the output of the microphone 31. If set to WORD, the camera 10 will electronically analyze information received from microphone 31 through analog-to-digital converter 37, in order to determine whether that detected sound corresponds to the sound of a selected word, such as the word "cheese". If set to LAUGHTER, the camera 10 will electronically analyze the sound information received from microphone 31 through analog-to-digital converter 37, in order to determine whether that detected sound corresponds to a predetermined laughter sound.

Figure 2:
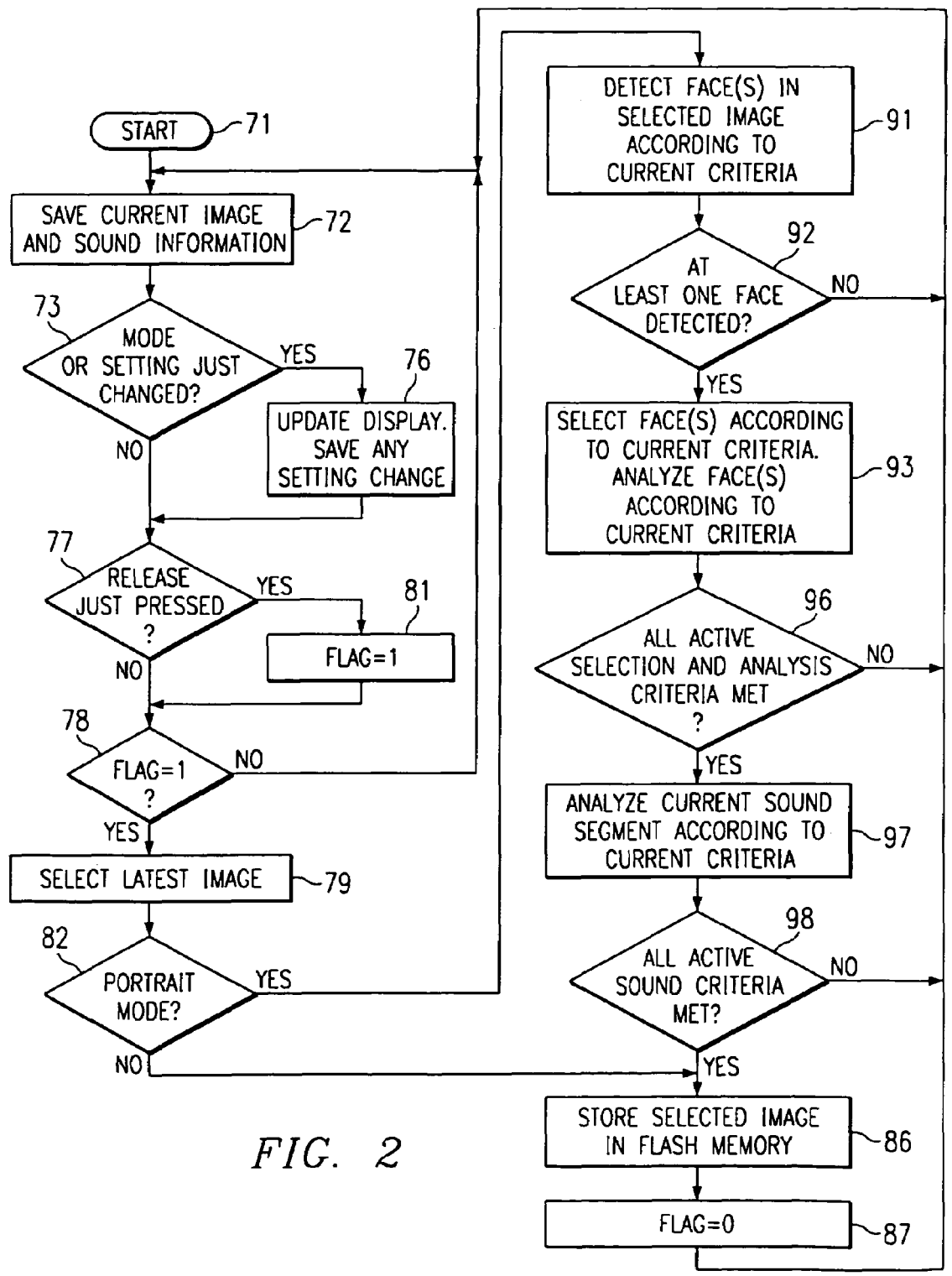
FIG. 2 is a flowchart showing a portion of a procedure which the camera of FIG. 1 carries out in order to select and record a digital image which is of high quality.

FIG. 2 is a flowchart representing a portion of the program which is in the ROM, and which is executed by the processor 56. This portion of the program includes the part which is capable of automatic analysis and selection of a digital image that is to be saved by the camera 10 in order to effect the taking of a picture. In FIG. 2, execution begins at block 71, and proceeds to block 72, where the processor 56 uses to RAM 58 to save current image information just obtained from the detector 21, and current sound information just obtained from the microphone 31 through analog-to-digital converter 37. As will become evident in a moment, block 72 is part of a main loop, and is thus repeatedly carried out, so that the system is saving current digitized image information and digitized sound information in an effectively continuous manner.

Control proceeds from block 72 to block 73, where the processor 56 checks to see whether the operator has just pressed either the mode select switch 47 or the setting select switch 48. If not, then control proceeds from block 73 to block 77. Otherwise, control proceeds from block 73 to block 76, where the processor 56 updates the information presented on display 51 so as to reflect the new mode and/or setting. Further, if it is a setting which the operator has changed, the processor 56 saves the new setting in the RAM 58, in place of the prior setting for the currently selected mode. Control proceeds from block 76 to block 77.

In block 77, the processor 56 checks to see whether the shutter release switch 46 has just been pressed. If not, then control proceeds to block 78. However, if the switch 46 has just been pressed, then control proceeds to block 81, where the processor sets a logical flag located in the RAM 58. Control then proceeds from block 81 to block 78.

In block 78, the processor 56 checks to see whether the flag is currently set. If the flag is set, it is an indication that the operator has pressed the shutter release switch 46, but that the camera 10 has not yet taken a picture, because the camera 10 has not yet detected an image which satisfies criteria corresponding to settings specified by TABLE 1, as discussed later. If the processor 56 determines that the flag is not currently set, then control proceeds from block 78 back to block 72, because the camera is not presently in the process of taking a picture.

On the other hand, if it is determined at block 78 that the flag is set, then the camera 10 is in the process of taking a picture, and control proceeds to block 79. In block 79, the camera 10 selects for analysis the latest image which was saved at block 72. Control then proceeds from block 79 to block 82.

In block 82, the processor 56 checks to see whether the PORTRAIT mode is enabled, or in other words whether the current setting for the PORTRAIT mode is ON. If the PORTRAIT mode is set to OFF, then all of the other modes and settings in TABLE 1 are ignored. In particular, control will proceed directly from block 82 to block 86, where the processor 56 will store the selected image in the flash memory 59, in order to effectively take a picture. Then, at block 87, the processor resets the flag. Thereafter, control is returned to block 72. It will thus be noted that, if the PORTRAIT mode is disabled, the camera 10 will take a picture by saving a digital image almost instantaneously after the shutter release switch 46 is pressed by the operator, without doing any analysis of the image.

In contrast, if it is determined at block 82 that the PORTRAIT mode is enabled, control proceeds to block 91, where the processor 56 begins analysis of the image which was selected at block 79. First, in block 91, the processor 56 attempts to detect faces in the selected image, which includes searching the selected digital image for a pixel pattern that appears to be representative of a human face, and which includes the application of criteria corresponding to settings listed in TABLE 1, as discussed below. In the disclosed embodiment, the search for pixel patterns is carried out using techniques which are known to those skilled in the art, and which are therefore not illustrated and described here in detail. A suitable technique is disclosed in Rowley et al. "Neural Network-Based Face Detection", Proceedings of the IEEE Computer Society Conference on Computer Vision and Pattern Recognition, IEEE, 1996.

These known search techniques can optionally be made even more efficient by searching for faces which are larger than a predetermined minimum face size, and/or smaller than a predetermined maximum face size, and rejecting any detected face which does not satisfy these predetermined size criteria. It should be noted that, if use of a predetermined minimum size is implemented, the predetermined minimum size would have to be less than the smallest minimum size setting permissible for the SIZE mode (TABLE 1).

It is also possible to optionally make the known search techniques more efficient by using a known technique for detecting a moving object using a moving camera, since both the camera and a human in the scene will often be moving relative to the scene and/or each other, rather than being stationary. Suitable techniques for identifying moving objects using a moving camera are known to those skilled in the art, and are therefore not discussed here in detail. For example, one known technique for detecting moving objects is disclosed in Burt et al., "Object Tracking with a Moving Camera", Workshop on Visual Motion, IEEE Computer Society Order Number 1903, March, 1989.

After a set of qualifying faces in the selected image has been identified in this manner, including the application of any predetermined minimum/maximum size criteria, the current setting for the SIZE mode is taken into account. If it is set to OFF, then no change is made to the set of faces which has already been identified. On the other hand, if it is set to one of the various MINIMUM SIZE settings, then every detected face which is smaller than this minimum size is rejected. The resulting set of detected faces is the set of detected faces which will be used for further processing.

Control proceeds from block 91 to block 92, where the processor 56 checks to see whether this resulting set of detected faces includes at least one face. If not, then control proceeds back to block 72, in order to wait for a subsequent image which includes at least one suitable face. This is because it was determined at block 82 that the PORTRAIT mode is set to ON, and camera 10 cannot properly save an image which is supposed to be a portrait if the image lacks any detectable human face.

Assuming that there is at least one human face in the image, control proceeds from block 92 to block 93, where the system carries out selection and analysis on the set of detected faces. More specifically, the system first selects one or more detected faces from the set, according to criteria corresponding to settings listed in TABLE 1. In particular, the selection of faces is carried out with reference to the current settings for the NUMBER OF FACES and PRIORITY modes.

More specifically, if the NUMBER OF FACES mode is set to ALL, then the processor 56 will select all of the faces which have been detected, and will ignore the current setting for the PRIORITY mode. Alternatively, if the NUMBER OF FACES mode is set to a number from 1 to N, the processor 56 will check to see whether the set of detected faces includes more faces than the specified number. If the number of detected faces is less than or equal to the number specified by the NUMBER OF FACES mode, then the processor 56 will select all of the detected faces, and will ignore the current setting for the PRIORITY mode. On the other hand, if the number of detected faces is greater than the number of faces specified by the setting for the NUMBER OF FACES mode, the processor will use the current setting of the PRIORITY mode to select a subset of the detected faces.

In more detail, if the current setting for the PRIORITY mode is NEAREST IMAGE CENTER, the processor 56 will select faces equal in number to the current setting of the NUMBER OF FACES mode, based on which faces in the selected image are closest to the center of the image. On the other hand, if the current setting of the PRIORITY mode is LARGEST, the processor 56 will select detected faces which are equal in number to the current setting of the NUMBER OF FACES mode, and which are the largest detected faces in the selected image.

After the processor 56 has selected faces in this manner, then the processor 56 (still in block 93) proceeds to analyze the selected faces according to other criteria, which correspond to settings listed in TABLE 1 for the EYES, MOUTH, and HEAD modes. In more detail, if the current setting for the EYES mode is OFF, then the processor 56 does not attempt to make any analysis associated with eyes which may be present in the detected image. On the other hand, if the current setting of the EYES mode is OPEN, then the processor 56 uses a known technique to identify eyes in the detected image, and to verify that the eyelids are open. Stated differently, the processor 56 attempts to verify that no detected and selected face in the selected image has an eye which is currently blinking. Suitable techniques for this evaluation of eyes are known to those skilled in the art, and are therefore not discussed here in detail. For example, a suitable known technique is set forth in Crowley et al., "Multi-Modal Tracking of Faces for Video Communications", Proceedings of the IEEE Computer Society Conference on Computer Vision and Pattern Recognition, IEEE, 1997.

In a similar manner, if the current setting of the MOUTH mode is OFF, the processor 56 will not make any attempt to analyze the mouth of each detected and selected face. However, if the current setting of the MOUTH mode is CLOSED, the processor 56 will use known image analysis techniques to identify a mouth in each detected and selected face, and to verify that the mouth is currently closed. This is intended to help the camera 10 avoid taking an image at a point in time when the mouth in one or more of the detected faces is open, for example because the associated person in the scene 12 is talking. Suitable techniques for this evaluation of mouths are known to those skilled in the art, and are therefore not discussed here in detail. For example, suitable known techniques are described in Black et al., "Learning Parameterized Models of Image Motion", Proceedings of the IEEE Computer Society Conference on Computer Vision and Pattern Recognition, IEEE, 1997.

Then, still in block 93, the processor 56 checks the current setting for the HEAD mode. If the current setting is OFF, then the processor 56 carries out no analysis of the orientation of faces. On the other hand, if the current setting is FACING CAMERA, then the processor 56 uses known image analysis techniques to determine whether each detected and selected face is oriented so as to be facing substantially directly toward the camera 10. Suitable known techniques for evaluating the orientation of a face/head are known to those skilled in the art, and are therefore not described here in detail. For example, one such known technique is set forth in Jebara et al., "Parametrized Structure from Motion for 3D Adaptive Feedback Tracking of Faces", Proceedings of the IEEE Computer Society Conference on Computer Vision and Pattern Recognition, IEEE, 1997.

Control then proceeds from block 93 to block 96, where the processor 56 checks to see whether the selected image failed to satisfy any active criteria used in block 93. For example, the selected image will be rejected if the current setting of the EYES mode is OPEN, and if the processor 56 found that any detected and selected face has an eyelid which is fully or partially closed. Similarly, if the current setting for the MOUTH mode is CLOSED, the selected image will be rejected if the processor 56 found that any detected and selected face had a mouth which was open to any significant extent. Likewise, if the current setting of the HEAD mode is FACING CAMERA, the selected image will be rejected if the processor 56 determined that one or more of the detected and selected faces are not oriented so as to substantially face the camera 10. If the processor 56 has determined that a selected image has failed to satisfy even a single criteria which is currently active, then the selected image is rejected and control proceeds from block 96 back to block 72, to obtain and analyze a new image from the scene 12.

On the other hand, if the processor 56 has not yet found any reason to reject the selected image, then control proceeds from block 96 to block 97, where the processor checks the current setting for the SOUND mode. If the current setting is OFF, then the processor 56 does not attempt to carry out any analysis of sounds which have been received through microphone 31. However, if the SOUND mode has any other setting, then the processor 56 analyzes a segment of sound which has just been received from the scene 12 through the microphone 31. In this regard, if the current setting of the SOUND mode is WORD, the processor 56 analyses the received sound pattern to determine whether it appears to correspond to the sound pattern for a known word, such as "cheese". If the processor 56 does not find a match, because no person in the vicinity of the microphone 31 appears to be currently speaking the selected word, then the processor 56 rejects the selected image. Alternatively, if the current setting for the SOUND mode is LAUGHTER, the processor 56 analyzes a sound segment from the microphone 31 in order to determine whether it corresponds to one or more known sound patterns corresponding to human laughter. If the processor 56 determines that there is not a match, because no person in the vicinity of the microphone 31 appears to be currently laughing, then the processor 56 rejects the selected image.

The disclosed embodiment carries out sound analysis to detect either laughter or a particular word by using techniques which are known to those skilled in the art, and which are therefore not described here in detail. For example, suitable known techniques for analyzing sound are discussed in Rabiner, "A Tutorial on Hidden Markov Models and Selected Applications in Speech Recognition", Proceedings of the IEEE, Volume 77, Number 2, February, 1989.

Control proceeds from block 97 to block 98, where the processor 56 checks to see whether there was any active sound criteria which was not met in block 97, and which thus caused the processor 56 to reject the selected image. If an active sound criteria has not been met, then control proceeds from block 98 back to block 72, in order to effectively reject the selected image and to obtain and analyze a new image. On the other hand, if all active sound criteria have been met, then control proceeds from block 98 to block 86 where, as already discussed above, the selected image is stored in the flash memory 59 in order to effect the taking of a digital picture. Then, at block 87, the processor 56 clears the flag, in order to indicate that a digital picture has been taken. Control then returns from block 87 to block 72.

In a variation of the procedure shown in FIG. 2, in block 81 the system could also start a timer and save the first video image received after the shutter release 46 is released. Then, if the timer expires before any determination is made at block 98 that all active criteria have been met, the system could store in the flash memory 59 the video image saved at block 81, rather than any image saved at block 79, and then proceed to block 87. On the other hand, if the timer has not yet expired and it is determined at block 98 that all active criteria have been met, control could proceed from block 98 through blocks 86 and 87, with block 87 including the additional step of turning off the timer.

The present invention provides a number of technical advantages. As one example, when the portrait mode of the disclosed camera is enabled, the camera will not necessarily take a digital picture immediately after the shutter release is operated. Instead, the camera will automatically wait until various criteria specified by the operator have all been met, and then save a digital image in order to effect the taking of a picture. By appropriately setting the various criteria, the camera operator can improve the quality of the resulting picture or image, by increasing the likelihood that persons in the image will be facing the camera, have their eyes open, and/or have their mouths closed. In this manner, the digital still camera according to the present invention can produce a much higher quality image than has previously been available from either film or digital still cameras. An example of a further technical advantage is that the disclosed camera can use analysis of sounds for purposes of selecting a digital image of a scene, so as to realize improved quality of the selected digital image.

Although one embodiment has been illustrated and described in detail, it should be understood that various changes, substitutions and alterations can be made therein. For example, several specific settings or criteria have been disclosed for use in evaluating whether to select a given image, but it will be recognized that a larger or smaller number of criteria, or different criteria, could be utilized for this purpose. Also, the disclosed camera uses an LCD display, but it will be recognized that other techniques could be used to communicate to an operator the current operational status of the camera. In addition, the disclosed camera uses a mode select switch and a setting select switch to adjust the current operational status of the camera, but it will be recognized that there are other arrangements which could be provided to allow an operator to adjust the operational status of the camera.

Moreover, the disclosed camera includes a microphone, and has the capability to analyze sounds received through the microphone for purposes of selecting an optimum digital image of a scene. However, it will be recognized that the microphone and associated sound analysis could be omitted. Also, the disclosed camera uses a flash memory to store digital images which represent the pictures taken by the camera, but there are other known techniques which could be used for storing these digital images. There are still other modifications which could be made to the disclosed camera, without departing from the spirit and scope of the present invention, as defined by the following claims.

What is claimed is:

1. A method for operating a camera, comprising the steps of waiting for an operator action, and responding to the operator action by:
    detecting information from a scene, the information comprising an image of radiation from the scene;
    evaluating the detected information by:
        identifying, in the image of radiation, a plurality of patterns each representative of a respective face;
        then selecting a subset of the patterns equal in number to a specified number; and
        then evaluating only the selected patterns in the subset relative to a human facial characteristic and a specified criteria;
    wherein the detecting and evaluating steps are performed in a continuing manner until a point in time at which it is determined that the information from the scene includes information that is representative of the human facial characteristic and that satisfies the specified criteria; and
    recording an image of the scene corresponding substantially to the point in time.

2. A method according to claim 1, wherein the selecting step also uses a prioritization criteria to select the subset.

3. The method for operating a camera, comprising the steps of:

responsive to an operator action, detecting visual information from a scene;

evaluating the detected visual information relative to a human facial characteristic and a specified criteria;

continuing the detecting and evaluating steps;

responsive to the evaluating step determining that the visual information from the scene includes information that is representative of the human facial characteristic and that satisfies the specified criteria, recording an image of the scene; and detecting audible sound from the scene;

wherein the evaluating step also evaluates the detected audible sound relative to the specified criteria;

and wherein the recording step is responsive to the evaluating step determining both that the visual information from the scene includes information that is representative of the human facial characteristic and satisfies a first specified criteria, and that the detected audible sound satisfies a second specified criteria.

4. A method according to claim 3, wherein the evaluating of the detected audible sound comprises determining whether the detected audible sound is representative of a predetermined word.

5. A method according to claim 3, wherein the evaluating of the detected audible sound comprises determining whether the detected audible sound is representative of laugher.

* * * * *